June 12, 1923.

A. E. FISHER 1,458,173

EXPANSIBLE AUTOMOBILE SEAT

Filed Nov. 22, 1922

INVENTOR
Adam E. Fisher.

June 12, 1923.

A. E. FISHER

EXPANSIBLE AUTOMOBILE SEAT

Filed Nov. 22, 1922

INVENTOR

Adam E. Fisher

Patented June 12, 1923.

1,458,173

UNITED STATES PATENT OFFICE.

ADAM E. FISHER, OF ST. LOUIS, MISSOURI.

EXPANSIBLE AUTOMOBILE SEAT.

Application filed November 22, 1922. Serial No. 602,544.

*To all whom it may concern:*

Be it known that I, ADAM E. FISHER, a citizen of the United States, and a resident of the city of St. Louis, in the State of Missouri, have invented new and useful Improvements in Expansible Automobile Seats, of which the following is a specification, reference being had to the accompanying drawings.

This invention is an expansible seat, primarily designed for automobiles, and the object is to provide a seat which may be readily lengthened endwise by expanding the ends thereof, in order to more conveniently accommodate three persons in the seat inended for two, and so prevent overcrowding.

Figure 1:
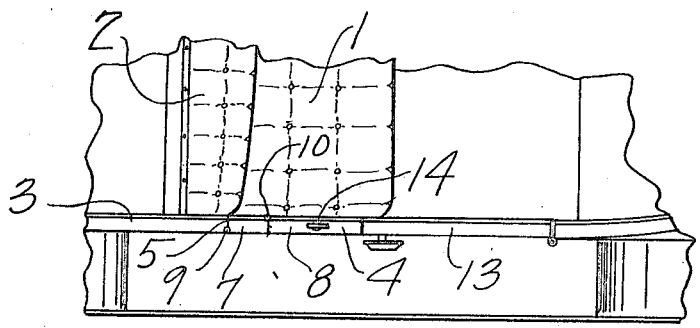
Figure 1 is a plan view of the seat, closed.
Figure 2:
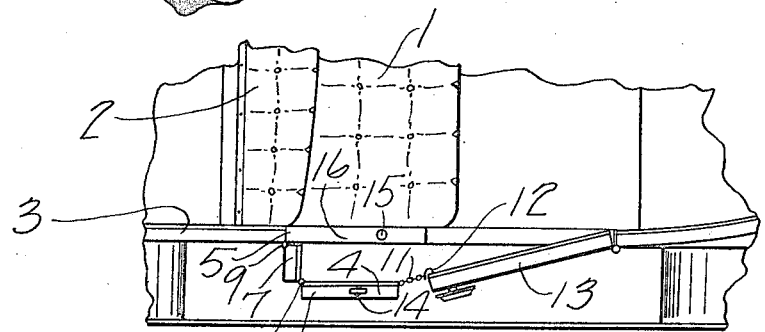
Figure 2 is a plan view of the seat, expanded.
Figure 3:
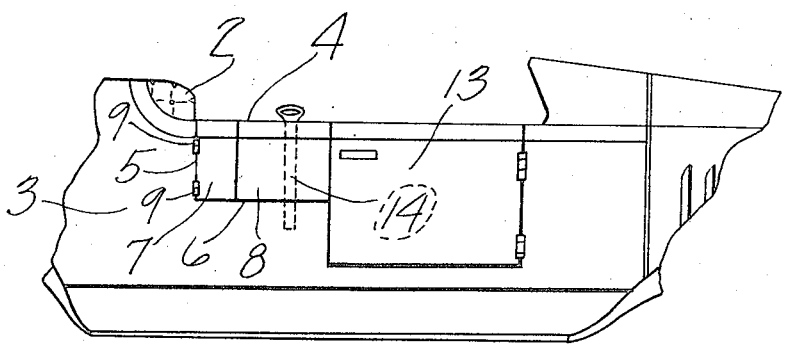
Figure 3 is a side view of the seat, closed.
Figure 4:
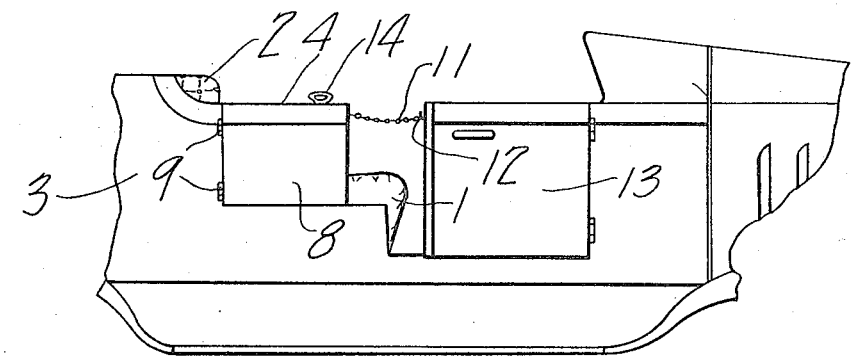
Figure 4 is a side view of the seat, expanded.
Figure 5:
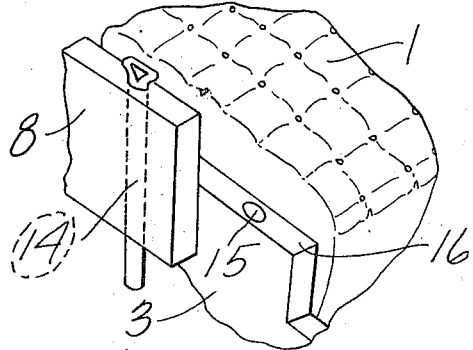
Figure 5 is a detail of the suitable panel lock.

Automobile seats are usually formed by mounting the seat 1 and the back 2 within the body of the automobile 3 in such position that the sides of the body at the portions forming door jambs project forwardly of the seat back 2 sufficiently to act also as ends 4 for the said seat.

Accordingly, this invention consists in cutting away these ends 4 of the seat on lines indicated at 5 and 6 conforming to the projected back and seat portions, and then splitting these end sections vertically, each into two panels 7 and 8. The panels 7 are then hinged rearwardly at 9 to the body sides and so as to swing horizontally backwardly and outwardly, while the panels 8 are in turn hinged at 10 to the panels 7 so as to swing horizontally inwardly. Where the doors are hinged forwardly, chains or links 11 are then attached by their ends to the forward edges of the panels 8 and their free ends are adapted to engage hooks 12 mounted at the edges of the doors 13. Thus the seat may be readily expanded at either or both ends by buckling the panels 7 and 8 outwardly and attaching the chains 11 to the hooks 12 on the doors. The panels 7 and 8 may be locked in their ordinary closed position in any suitable manner, as by spring set bolts 14 slidingly mounted in or on the panels 8 and adapted to engage recesses 15 cut in the lower body side or seat end 16.

While I have herein described a certain specific method of constructing and assembling the elements of my invention, it is understood same may be varied in minor details, not departing from the spirit of my invention as defined in the appended claims.

I claim:

1. In combination with an automobile seat and body having the seat end portions cut away, expansible ends for the seat, comprising panels hinged together and then in turn hinged rearwardly to the body in lieu of the cut away portions, and so as to buckle horizontally backwardly outwardly.

2. In combination with an automobile seat and body having the seat end portions cut away, expansible ends for the seat, comprising panels hinged together and then in turn hinged rearwardly to the body in lieu of the cut away portions, and so as to buckle horizontally backwardly outwardly; and means for locking the panels in closed position.

3. In combination with an automobile seat and body having the seat end portions cut away, expansible ends for the seat, comprising panels hinged together and then in turn hinged rearwardly to the body in lieu of the cut away portions, and so as to buckle horizontally backwardly outwardly; and a link releasably connecting the forward panels to the doors.

4. In combination with an automobile seat and body having the seat end portions cut away, expansible ends for the seat, comprising panels hinged together and then in turn hinged rearwardly to the body in lieu of the cut away portions, and so as to buckle horizontally outwardly; means for locking the panels in closed position; and a link releasably connecting the forward panels to the doors.

5. In combination with an automobile seat and body having the seat end portions cut away, expansible ends for the seat, comprising panels hinged together and then in turn hinged rearwardly to the body in lieu of the cut away portions, and so as to buckle horizontally backwardly outwardly; and means for limiting the outward swing of the panels.

6. In combination with an automobile seat and body having the seat end portions cut away, expansible ends for the seat, comprising panels hinged together and then in turn hinged rearwardly to the body in lieu of the cut away portions, and so as to buckle horizontally backwardly outwardly; means for locking the panels in closed position; and means for limiting the outward swing of the panels.

ADAM E. FISHER.

Witnesses:
A. K. DOHLE,
A. M. DOWD.